United States Patent [19]
LaRosa

[11] 4,311,971
[45] Jan. 19, 1982

[54] APPARATUS FOR GENERATING CONSTANT-ENVELOPE, ANGLE-MODULATED PULSE SIGNALS

[75] Inventor: Richard LaRosa, South Hempstead, N.Y.

[73] Assignee: Hazeltine Corporation, Greenlawn, N.Y.

[21] Appl. No.: 76,712

[22] Filed: Sep. 19, 1979

[51] Int. Cl.³ .......................... H03C 3/40; H03K 7/06
[52] U.S. Cl. .......................... 332/9 R; 332/23 A; 375/45; 375/62
[58] Field of Search .................. 332/9 R, 11 R, 16 R, 332/23 A; 375/45, 52, 62, 67

[56] References Cited

U.S. PATENT DOCUMENTS 3,517,338  6/1970  Herman et al. ................ 375/62 X
3,699,479  10/1972  Thompson et al. ............. 332/16 R
3,973,201  8/1976  Andren ....................... 375/67

*Primary Examiner*—Siegfried H. Grimm
*Attorney, Agent, or Firm*—E. A. Onders; F. R. Agovino

[57] ABSTRACT

An improved constant-envelope, angle-modulated pulse signal generator makes use of first and second bi-phase amplitude modulators, each for modulating a carrier with supplied pulse signals. The pulse signals are representative of information and are interleaved with each other. The pulse duration is selected to cause a suitable amount of pulse overlap. When the modulated carriers are combined in phase quadrature and passed through a surface acoustic wave filter, they form a constant envelope signal. Appropriate selection of parameters can yield a sinusoidal frequency shift keyed (SFSK) signal.

9 Claims, 9 Drawing Figures

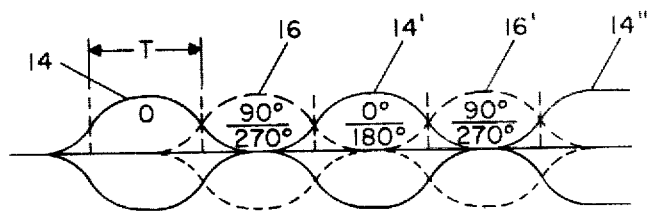
FIG. 1
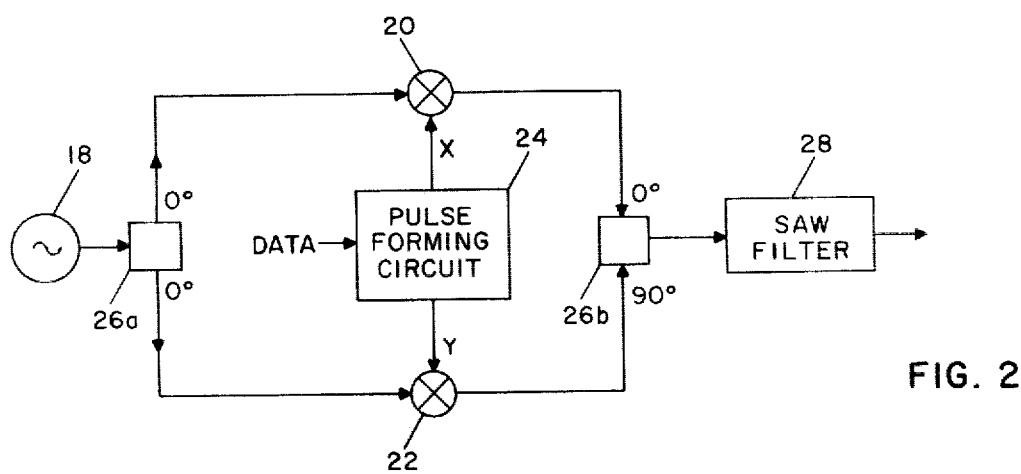
FIG. 2
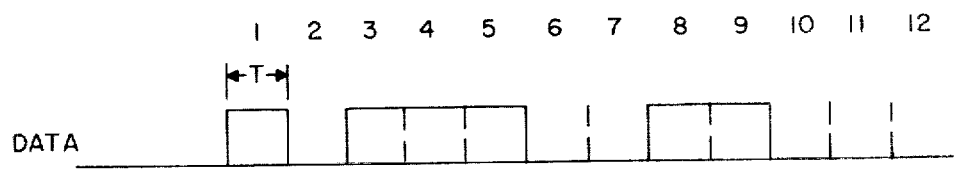
DATA — FIG. 3A
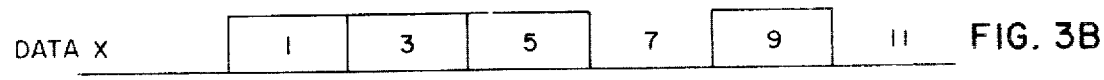
DATA X — FIG. 3B
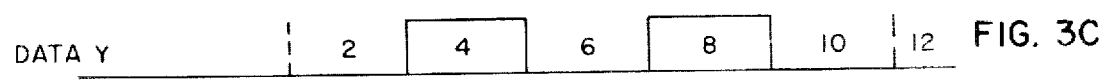
DATA Y — FIG. 3C
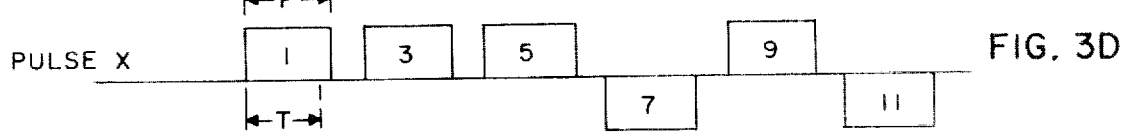
PULSE X — FIG. 3D
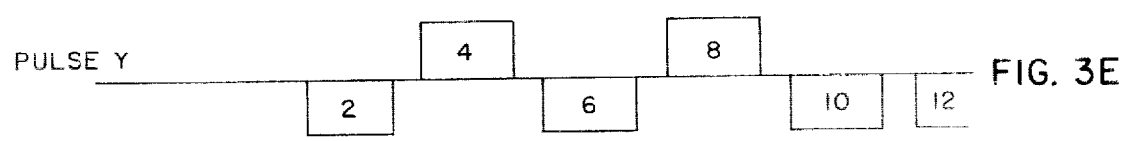
PULSE Y — FIG. 3E

APPARATUS FOR GENERATING CONSTANT-ENVELOPE, ANGLE-MODULATED PULSE SIGNALS

BACKGROUND OF THE INVENTION

This invention relates to apparatus for generating constant-envelope, angle-modulated signals, such as a sinusoidal frequency shift keyed (SFSK) signal. Such signals are useful in connection with modern digital communications systems for transmitting data or other signals using digital modulation. In particular the SFSK modulation technique is a quadrature phase modulation technique which has essentially a uniform amplitude signal envelope. The uniform amplitude signal envelope arises out of a sinusoidal shift between the inphase-antiphase portion of a quadrature phase signal and the quadrature portion of the signal.

SFSK signals are conventionally developed using apparatus which provides two specially shaped pulsed modulating signals which are used to amplitude modulate quadrature phase carrier signals with shaped interleaved pulses. After modulation, the carriers are combined to provide the composite four phase SFSK signal.

It is an object of the present invention to provide a new, improved, and simplified modulator for generating a constant-envelope, angle-modulated pulse signal using an acoustic surface wave filter.

SUMMARY OF THE INVENTION

In accordance with the invention there is provided apparatus for generating a uniform amplitude envelope, angle-modulated pulse signal. The apparatus includes first and second bi-phase modulators, each for amplitude modulating a carrier with respective first and second supplied pulse signals. There are also provided means for supplying a carrier to the modulators and means for combining the amplitude modulated carrier from the first and second modulators in quadrature phase relationship. The combined amplitude-modulated carriers are supplied to an acoustic surface wave filter which is responsive to the combined modulated carriers for generating the uniform envelope, angle-modulated pulse signal. The apparatus also includes means responsive to information representative signals for generating the first and second pulse signals. The second pulse signal has pulses which are interleaved with the pulses of the first pulse signal. The pulses of the first and second pulse signals are representative of the information and have pulse spacing and pulse duration which are selected to overlap by an amount suitable to generate a uniform envelope, angle-modulated signal at the output of the filter.

In accordance with one embodiment of the invention, the pulse duration is selected to be in excess of a time T which is equal to one-half of the pulse spacing for each of the signals, so that pulses in the first and second pulse signals overlap by a selected amount, for example, a pulse duration of approximately 1.17 T. The acoustic surface wave filter preferably includes first and second interdigital transducers which have impulse response characteristics which are selected, for example, to generate a sinusoidal frequency shift keyed (SFSK) signal in response to the combined amplitude modulated carriers. In one embodiment the interdigital transducers are unapodized and have a length in the transmission direction of between three and six acoustic wave lengths. In one embodiment one of the transducers has a length of four wavelengths while the other transducer has a length of five wavelengths.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

FIG. 1 is a graph illustrating the envelopes of the individual pulses which, when superimposed, comprise a sinusoidal frequency shift keyed signal of the type which is generated by one embodiment of the present invention.

FIG. 2 is a schematic and block diagram of one embodiment of signal generating apparatus in accordance with the present invention.

FIGS. 3A, 3B, 3C, 3D and 3E illustrate pulse signals which are used in the apparatus of FIG. 2.

DESCRIPTION OF THE INVENTION

Figure 4:
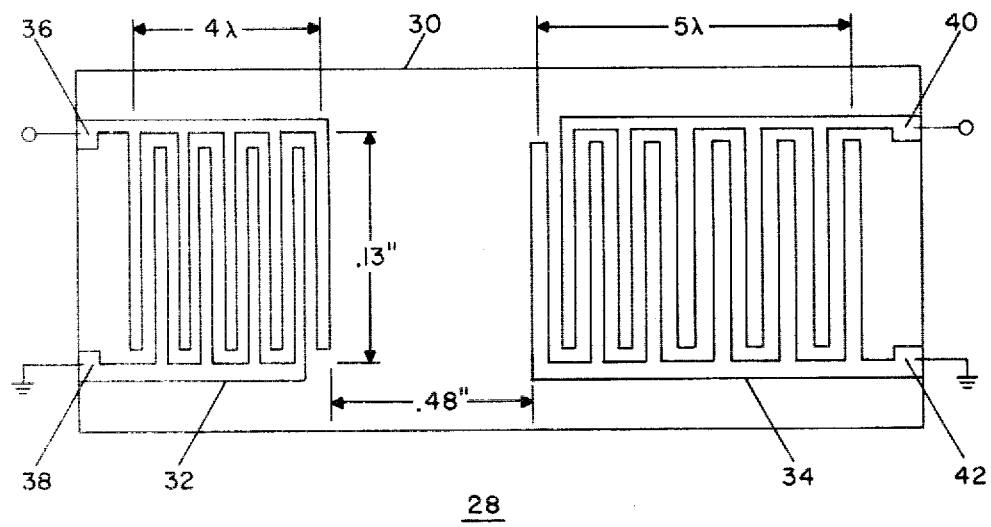
FIG. 4 is a plan view of an acoustic surface wave filter usable in connection with the apparatus of FIG. 2.

The drawing of FIG. 1 illustrates a sinusoidal frequency shift keyed (SFSK) signal, which is useful in modern digital communications systems. FIG. 1 illustrates the two quadrature phase components of the composite SFSK signal and their relationship to each other in time. The signal includes inphase components 14, 14' and 14" which have a relative phase relation of 0° or 180°, depending on the supplied data. Interleaved with these inphase signals there are provided quadrature phase signals 16 and 16' which have a relative phase of either 90° or 270°. Thus signal components 14, 14' and 14" are always in quadrature phase relationship to the interleaved quadrature signal components 16 and 16'. In either of these signal components the polarity of the particular signal portion is representative of data which is being transmitted through the system. Thus, any particular time interval T contains a pulse type signal which has one of two possible phases, the phase of which is representative of a binary information bit.

A distinguishing characteristic of a constant-envelope signal in general and an SFSK signal in particular is the fact that the amplitude of the quadrature related signal components is tapered in a manner which provides a gradual phase transition between signal portions, and hence a limitation on the frequency spectrum of the composite signal. In addition, the overlap of the individual pulse components of the composite signal is selected so that the composite signal has substantially uniform amplitude. Thus the amplitude of pulse 14 gradually decreases over a time interval which is approximately equivalent to the interval of the time frame T between pulse crossovers. This decay is shaped so that at the crossover between pulse 14 and 16 each of the pulses has a relative amplitude of 0.707, which provides a total amplitude of unity following vector addition of the quadrature signal components. It is an object of the present invention to provide a simple apparatus for generating constant-amplitude, angle-modulated signals such as the SFSK signal of the type shown in FIG. 1. Such apparatus is shown in FIG. 2.

The FIG. 2 apparatus includes a signal generator 18 which generates a carrier signal typically at a selected intermediate frequency, for example, 70 Mhz. In the embodiment of FIG. 2 the intermediate frequency signal is supplied from oscillator 18 to balanced mixers 20 and 22 via in-phase power splitter 26a. Mixers 20 and 22 are provided with pulse signals X and Y from pulse forming circuit 24, which correspond to data signals that have been modified in accordance with the present invention, as will be presently described. Following modulation of the carrier signals by the X and Y pulse signals, the modulated carriers from mixers 20 and 22 are combined with quadrature phase in hybrid 26b and provided to an acoustic surface wave (SAW) filter 28. Filter 28 acts on the modulated carrier signals to generate a composite signal which closely approximates the SFSK signal of FIG. 1. The signal modification arises out of the filtering characteristics of the interdigital transducers on the SAW filter, as will be described.

FIG. 3A illustrates data pulses of a type which can be transmitted in an SFSK modulated format. The data pulses consist of the presence or absence of signals during individual time periods each having a duration T. The periods illustrated are numbered 1 through 12. The presence of a signal during a period may be represented by the digital logic 1 while the absence of a signal is represented by the digital logic 0. Thus, the data illustrated in FIG. 3A represents a 1 during the first interval, a 0 during the second, 1 during the third, fourth and fifth intervals and so forth. If these signals are to be transmitted in a typical quadrature phase format for an SFSK signal, it is necessary to transmit alternate information bits on separate quadrature components of the composite SFSK signal. Consequently, it is necessary to separate the bit stream of FIG. 3A into two separate interleaved bit streams which are shown in FIGS. 3B and 3C. The data bit stream X of FIG. 3B includes information bits representative of a first set of alternate data bits of the original data stream of FIG. 3A. Thus the data in FIG. 3B represents the first, third, fifth, seventh, ninth and eleventh bits of the FIG. 3A data stream. Each of the data bits occupies a spacing which is equal to 2T. Likewise the data signal in FIG. 3C represents the second, fourth, sixth, eighth, tenth, and twelfth bits of the FIG. 3A signal. Those skilled in the art will recognize that logic circuits or microprocessors can be eaily used to convert the data stream of FIG. 3A into the contiguous interleaved data streams of FIGS. 3B and 3C.

Likewise, the data streams of FIGS. 3B and 3C can be converted into the positive and negative going pulse signals of FIGS. 3B and 3E. In these Figures each of the data bits of the signals of FIGS. 3B and 3C are converted into a positive pulse having a duration P if the original data signal is representative of a 1 and are converted into a negative going pulse of duration P if the original data signal is representative of a 0. The pulse duration P is selected to be greater than the original data interval T, but is less than the pulse length of the data streams of FIGS. 3B and 3C. As may be seen by reference to FIGS. 3D and 3E, the interleaved relationship of the pulses of FIGS. 3B and 3C results in an interleaved relationship of the pulse signals X and Y which are illustrated in FIGS. 3D and 3E. The pulse signal X of FIG. 3D can be generated by conventional three-state digital logic circuits from the pulse signals of FIG. 3B by, for example, offsetting the zero level of data signal X and gating the bipolar waveform. Likewise, the pulse signal Y of FIG. 3E can be generated by similar conventional techniques. The pulse forming circuit 24 which is illustrated in block diagram form in FIG. 2 can, therefore, be easily fabricated by a person of ordinary skill to use the data stream of FIG. 3A, or other data forms, to develop the pulse signals X and Y shown in FIGS. 3D and 3E.

The pulse signals of FIGS. 3D and 3E are supplied to the balanced mixers 20 and 22 in FIG. 2 to modulate the carrier signal supplied from oscillator 18 to form first and second modulated carrier signals, each of which has positive and negative phase relationship to the original data signal according to whether the pulses provided in the pulse signals X and Y are positive or negative going pulses. Thus, the output of balanced mixer 20 will be in 0° phase relationship if there is a positive going signal in pulse signal X and will be in 180° phase relationship if there is a negative going signal in pulse signal X. Similar signals will be generated in mixer 22 by pulse signal Y.

The two component amplitude modulated signals which are supplied from mixers 20 and 22 are combined with a quadrature phase relationship in hybrid 26b. The quadrature phase relationship forms a composite signal which has overlapping quadrature components and consequently has a nonuniform amplitude. The amplitude of this combined signal is enhanced in the region where the pulses of pulse stream X overlap the pulses of pulse stream Y. The composite signal is provided to SAW filter 28 which has properties selected to modify the square pulse shape of the components of the composite signals to form an SFSK signal of the type which is shown in FIG. 1, which has a constant (uniform) amplitude characteristic. The operation of the apparatus of FIG. 2 is unchanged if inphase power splitter 26a and quadrature hybrid 26b are interchanged.

FIG. 4 illustrates the electrode pattern for an interdigital SAW filter of a type suitable for use in the apparatus of FIG. 2. The FIG. 4 drawing has a scale which is convenient to illustrate the nature of the transducers and their relationship, but is not drawn precisely to a scale which is representative of the relative size of the transducer elements.

The SAW filter 28 illustrated in FIG. 4 includes a lithium niobate substrate 30, which may be 128° cut to suppress bulk wave transmissions. On one surface of the substrate there are formed input and output transducers 32 and 34, respectively, which comprise conductive films deposited on the surface of the lithium niobate substrate. Each of the transducers 32 and 34 includes interdigital fingers connected to conductive terminals. Transducer 32 includes five conductive fingers connected to terminal 36 and four interleaved fingers connected to terminal 38. The center-to-center spacing between adjacent fingers is nominally one-half of the acoustic wavelength at the operating frequency of the transducer. Therefore the input transducer 32, which has a total of nine interdigital fingers, has an overall transducer length of four wavelengths measured between the center of the first and the center of the last finger of the transducer. Likewise the transducer 34, which is an output transducer, has a transducer length of five wavelengths, and has eleven fingers interleaved and connected to respective terminals 40 and 42. The SAW filter is used by supplying signals to terminal 36 and taking the output at terminal 40. Terminals 38 and 42 are grounded. Various techniques well known to those skilled in the art of SAW filter fabrication may be used to minimize reflections within SAW filter 28 without affecting the overall operation of the filter as described herein.

Interdigital transducer 32, which has an effective length of slightly greater than four acoustic wavelengths, has an impulse response whose envelope is a square wave of a duration of approximately 64 Nanoseconds. Likewise the envelope of the impulse response of transducer 34 is a square wave of duration of approximately 78 Nanoseconds. This impulse response is slightly in excess of the response which would be predicted using the four wavelength and five wavelength nominal length of the interdigital transducers, since the actual effective length of transducers is approximately equal to the edge to edge measurement of the metallic end fingers of the transducer.

The SAW filter illustrated in FIG. 4 is suitable for use with a 70 Mhz carrier signal which is modulated by pulse signals having pulses occurring at the rate of 5 Mhz, so that each of the modulators 20 and 22 is supplied with a pulse signal having a rate of 2.5 Mhz. The length of the pulses is properly selected to be 234 Nanoseconds, or 1.17 T where T is one-half the time between pulses supplied to each of the modulators. For pulses having the duration and frequency described and modulating a carrier signal of 70 Mhz, the transducers illustrated in FIG. 4 for the SAW filter are suitable for modifying the composite modulated signal, appearing at the output of hybrid 26b in order to form an SFSK output signal.

The SAW filter illustrated in FIG. 4 has unapodized interdigital transducers in order to obtain the proper square envelope impulse response for each of the transducers. The aperture size of the transducers is approximately 0.13 inches as indicated in FIG. 4. The space between the transducers is approximately 0.48 inches. These particular values are not especially critical for purposes of forming the SFSK modulated signal. More important to the formation of this type of signal is the use of the properly selected transducer lengths which cause appropriate modification of the envelope of the supplied square wave type signal, and the supplying of a square wave type signal having a pulse duration in excess of one-half of the interpulse spacing, as described, in order that the characteristics of the SAW filter can act on the pulse modulated composite signal to form the desired SFSK signal.

Figure 5:
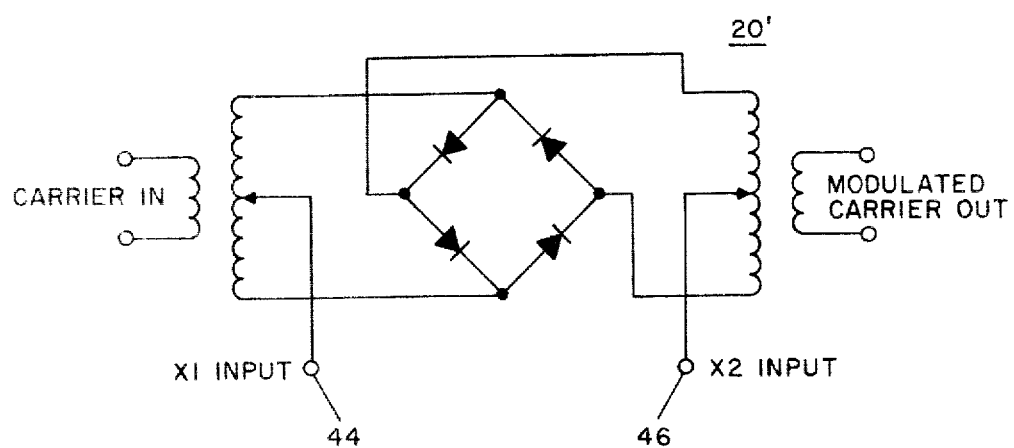
FIG. 5 is a schematic diagram of a diode balanced mixer usable in connection with the apparatus of FIG. 2.

As an alternative to the format of the pulses illustrated in FIG. 3, those skilled in the art will recognize that it is also possible to provide multiple pulse signals to the balanced mixers 20 and 22. Thus, pulse signal X illustrated in FIG. 3D could take the form of two pulse signals, one having pulses corresponding to the positive going pulses of the FIG. 3D signal and the other having pulses corresponding to the negative going pulses of FIG. 3D. However, for convenience the invention is described and claimed herein as though a single signal is used since overall operation of the apparatus of FIG. 2 is the same in either case. The reason for using two signals instead of the single signal illustrated in FIG. 3D, for example, is because conventional TTL logic circuits generally provide only 0 or +5 volt levels, and it would be necessary to depart from these conventional and easily obtained circuits in order to generate the signal type illustrated in FIG. 3D. When two separate signals X1 and X2 are used, they may be supplied to separate terminals 44, 46 of a diode balanced mixer 20', as shown in FIG. 5, with the effect that supplying a pulse to terminal X1 gives a positive or inphase modulation of the carrier signal, while supplying a pulse to terminal X2 provides a negative or out-of-phase modulation of the carrier signal. Providing no signal or signals on both leads X1 and X2 gives no mixer output. A similar arrangement can be implemented for the pulse signal Y illustrated in FIG. 3E.

While the present invention has been described with respect to a particular embodiment operating at a carrier frequency of 70 Mhz and using a data rate of 5 Mhz, those skilled in the art will recognize that other values for the carrier frequency, data rate, and signal characteristics may be used with corresponding changes in other system variables. Variations in the input and output signal formats are also possible within the spirit of the invention. It is therefore intended to claim all such changes and modifications as fall within the true scope of the invention.

I claim:

1. Apparatus for generating a constant-envelope, angle-modulated pulse signal, comprising:
   a first bi-phase modulator, for amplitude modulating a carrier with a first supplied pulse signal;
   a second bi-phase modulator, for amplitude modulating a carrier with a second supplied pulse signal;
   means for supplying a carrier to said first and second modulators;
   means for combining the amplitude modulated carriers from said first and second modulators in a selected phase relation;
   a surface acoustic wave filter, responsive to said combined modulated carriers for generating said constant-envelope, angle-modulated pulse signal;
   and means, responsive to a supplied information bearing input signal, for generating said first and second pulse signals, said second pulse signal having pulses interleaved with the pulses of said first pulse signal, the pulses of said first and second pulse signals being representative of said information and said pulses having pulse spacing and pulse duration selected to cause pulse overlap by an amount suitable to generate a constant-envelope, angle-modulated pulse signal at the output of said filter.

2. Apparatus as specified in claim 1 wherein said pulse duration is in excess of a time T equal to one-half said pulse spacing for each of said signals, whereby pulses in said first and second pulse streams overlap by a selected amount.

3. Apparatus as specified in claim 1 wherein said apparatus generates a constant-envelope, sinusoidal frequency shift keyed signal at the output of said surface acoustic wave filter.

4. Apparatus as specified in claim 3 wherein said acoustic surface wave filter includes first and second interdigital transducers, said transducers having impulse response durations selected to generate said constant-envelope, sinusoidal frequency shift keyed signal in response to said combined modulated carrier.

5. Apparatus as specified in claim 4 wherein said transducers are unapodized.

6. Apparatus as specified in claim 4 or 5 wherein each of said transducers has a length in the transmission direction of between 0.1 T and 0.6 T, where T is a time equal to one-half said pulse spacing.

7. Apparatus as specified in claim 6 wherein one of said transducers has a length in said transmission direction of 0.32 T.

8. Apparatus as specified in claim 6 wherein one of said transducers has a length in said transmission direction of 0.39 T.

9. Apparatus as specified in claim 3 wherein said pulse duration is approximately 1.17 T, where T is a time equal to one-half said pulse spacing.

* * * * *